United States Patent [19]

Hake et al.

[11] 4,368,783
[45] Jan. 18, 1983

[54] UNIVERSAL AUXILIARY IMPLEMENT MOUNT

[75] Inventors: Kenneth A. Hake; Nelson J. Palen, both of Tipton, Kans.

[73] Assignee: Kent Manufacturing Co., Inc., Tipton, Kans.

[21] Appl. No.: 181,637

[22] Filed: Aug. 26, 1980

[51] Int. Cl.³ .......................................... A01B 19/02
[52] U.S. Cl. ................................ 172/705; 172/621; 172/643; 172/198; 172/763
[58] Field of Search ............... 172/621, 573, 705, 619, 172/572, 497, 620, 500, 195, 198, 573, 710, 763, 439; 403/4, 71

[56] References Cited

U.S. PATENT DOCUMENTS

| 2,637,262 | 5/1953 | Altgelt | 403/108 |
|---|---|---|---|
| 2,649,725 | 8/1953 | Oehler | 172/669 |
| 2,741,494 | 4/1956 | Oehler | 172/439 |
| 3,235,013 | 2/1966 | Kirkpatrick | 172/413 |
| 3,532,171 | 10/1970 | Kasten | 172/197 |
| 3,613,802 | 10/1971 | Carlson | 172/457 |
| 4,002,413 | 1/1977 | Foster | 403/234 |
| 4,029,155 | 6/1977 | Blair | 172/763 |
| 4,127,341 | 11/1978 | Stevens | 402/113 |
| 4,171,172 | 10/1979 | Johnston | 403/71 |
| 4,173,261 | 11/1979 | Wells | 172/136 |
| 4,220,211 | 9/1980 | Hake | 172/618 |

OTHER PUBLICATIONS

Emmert—Minimum Tillage Mulcher—Tine Mulcher Advertizement of Emmert Mfg. Co., Audubon, Ia. 9/26/79.
Glencoe, "Soil Saver Equipment Right for Your Soil", Model LH3, Advertizing Brochure of Glencoe Mfg., Glencoe, Mn. 9/26/72.
Noble Mfg. Co., Advertizing Brochure—Cultivator Mulcher, p. 7, 9/26/72, Sac City Ia.

Primary Examiner—Richard J. Johnson
Attorney, Agent, or Firm—Litman, Day and McMahon

[57] ABSTRACT

A universal auxiliary implement mount for agricultural implements utilizes spaced, parallel, triangular plate members for attachment and selective positioning on respective tool bars of different main implements. A draw tongue is pivotally attached to one pair of a pair of mounting apertures extending through central portions of the triangular plate members. A biasing rod has one end which is pivotally attached to the draw tongue and extends in an upward angle with the other end thereof received in an apex portion of the triangular plate members. The biasing rod has a spring therewith which selectively exerts downward pressure on the draw tongue while allowing vertical movement over rough ground surfaces. The triangular plate members are selectively positionable longitudinally and rotatably on the tool bar whereby, in one mount position, the draw tongue is pivotally affixed to the mount by one pair of mounting apertures and in another mount position, the draw tongue is pivotally affixed to the mount by a second pair of mounting apertures. The spaced draw tongue mounting apertures permit the mount to be variously positioned on a tool bar while maintaining equal geometric relationships between the triangular plate members, the draw tongue and the biasing rod.

9 Claims, 6 Drawing Figures

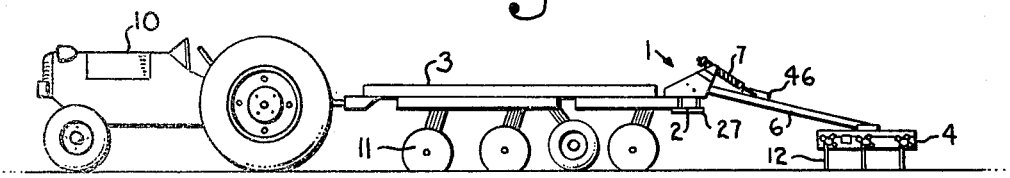
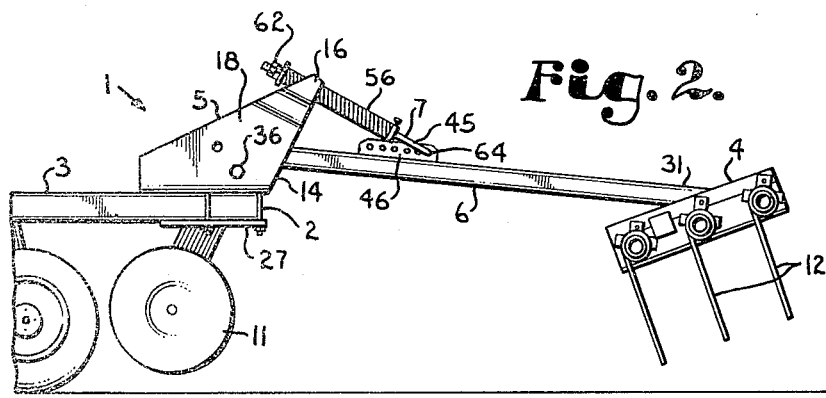
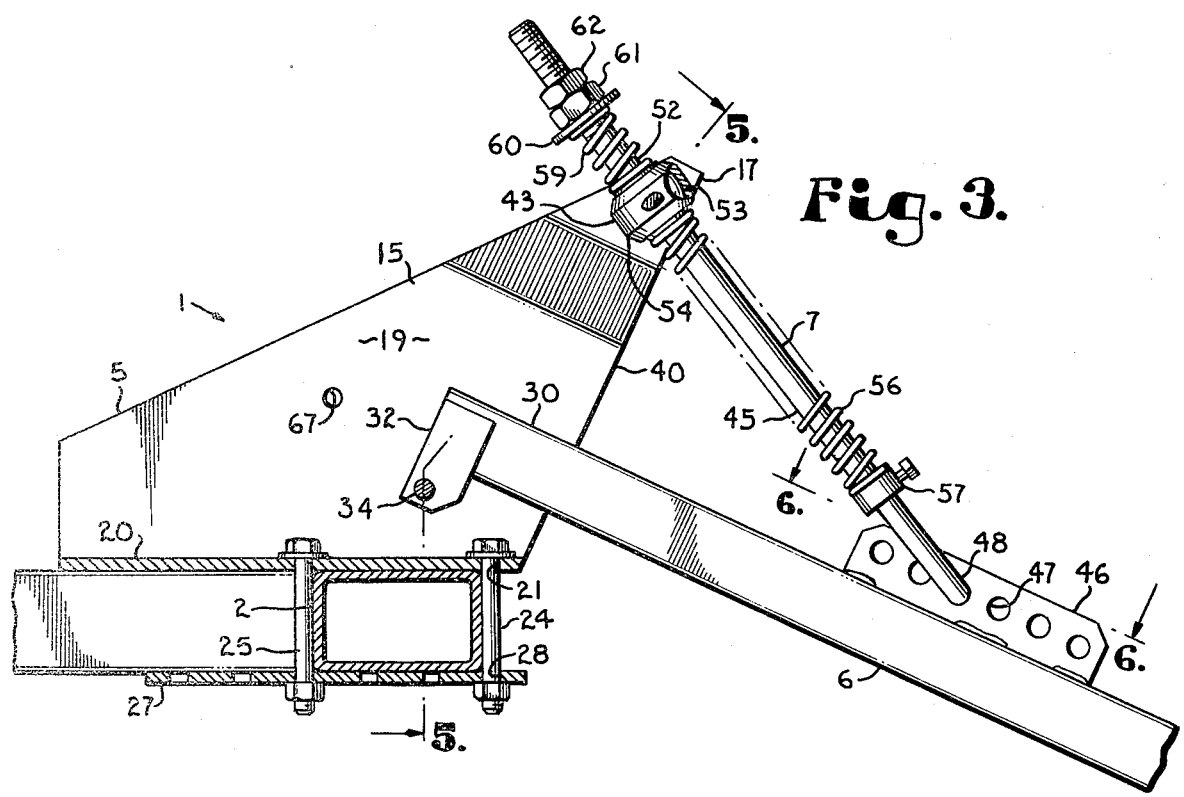

UNIVERSAL AUXILIARY IMPLEMENT MOUNT

This invention relates to agricultural implement mounts and in particular, to mounts for attachment to a toolbar of a main or first implement in order to connect an auxiliary implement thereto.

In order to lessen the number of times that a field must be worked prior to planting, a farmer generally prefers to connect as many cultivating tools as possible to a prime mover such as a farm tractor, whereby a finished seedbed remains after a single pass of the field. Without the capability to prepare a finished seedbed with a single pass, multiple tillage and finishing operations must be accomplished to first disc or plow the field and then smooth the surface thereof, such as with a finishing harrow. Moreover, use of a finishing harrow after ammonia or herbicide incorporation tends to seal the soil surface to retain the applied material therein.

Many different types and configurations of tillage implements and finishing tools are available, however heretofore, problems have been encountered in connecting the finishing tool to the tillage implement. In particular, the variety of forms of the tool bars of the various tillage implements make it difficult to mount the finishing tools thereto and often single application mounts must be constructed.

In view of the above, the principal objects of the present invention are: to provide a universal auxiliary implement mount to connect a finishing tool to most available types of tillage implements; to provide such an implement mount which can be affixed to tool bars of different thicknesses; to provide such an implement mount which can be either affixed to a tool bar in a top mount position or in a rear side mount position; to provide such an implement mount which permits attachment to either swept wing or angled disc gang frames; to provide such an implement mount which permits a finishing harrow to be attached thereto and selectively adjusted in one of a number of different mounting heights in and out of engagement with a ground surface; to provide such an implement mount having means for depth and pressure adjustment therewith; to provide such an implement mount having means for raising an auxiliary implement attached thereto to a non-use position out of ground engagement; and to provide such an implement mount which is economical to manufacture, durable in use and particularly well adapted for its intended purpose.

Other objects and advantages of this invention will become apparent from the following description taken in connection with the accompanying drawings wherein is set forth, by way of illustration and example, an embodiment of this invention.

FIG. 1 is a diagrammatic view of a universal auxiliary implement mount in the environment of use thereof and embodying the present invention, showing the implement mount connecting an auxiliary implement to a main tillage implement.

FIG. 2 is an enlarged elevational view of the implement mount connecting an auxiliary implement to a tillage implement.

FIG. 3 is an elevational view, greatly enlarged, of the implement in a top mount position.

Figure 4:
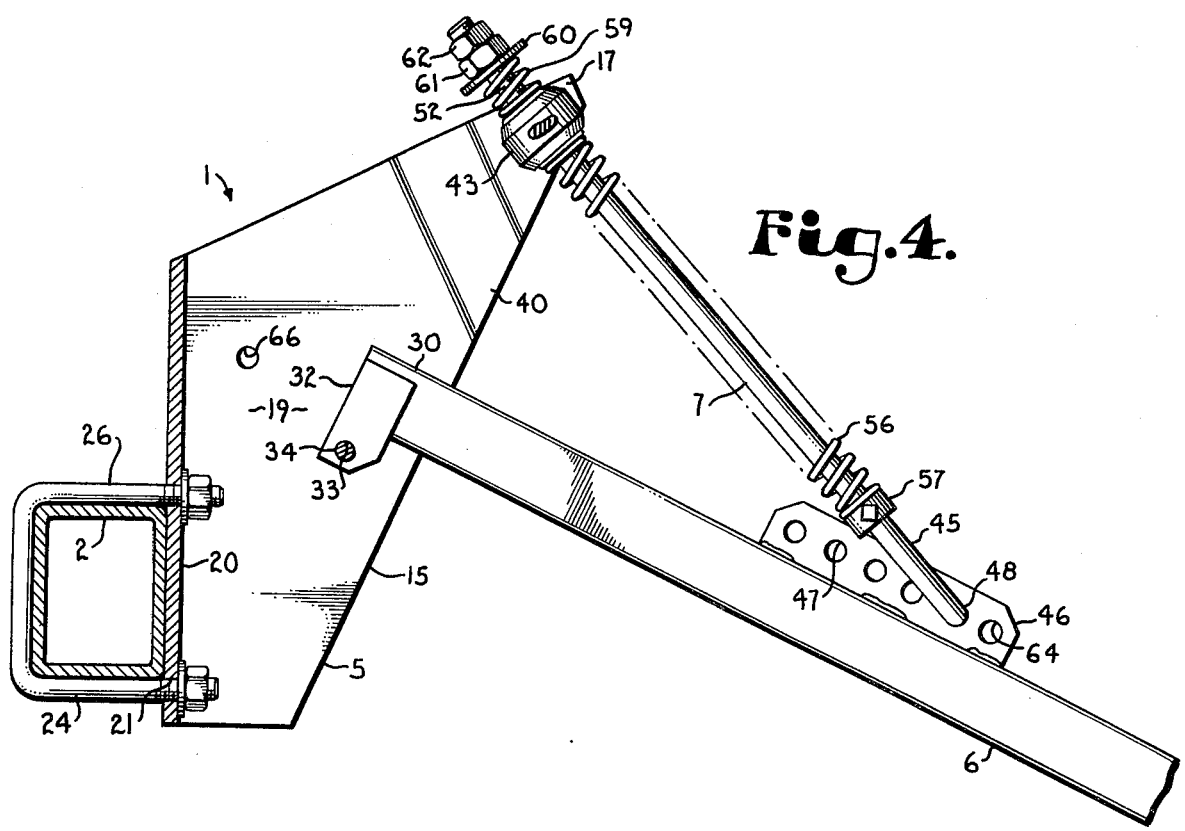
FIG. 4 is an elevational view, greatly enlarged, of the implement mount in a rear side mount position.

As required, a detailed embodiment of the present invention is disclosed herein, however, it is to be understood that the disclosed embodiment is merely exemplary of the invention which may be embodied in various forms, therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1, FIG. 1, generally indicates a universal auxiliary implement mount for agricultural implements and adapted for selective positioning on a respective tool bar 2 of a first implement 3 for connecting an auxiliary implement 4 thereto. The implement mount 1 generally includes a mount member 5 with a draw tongue 6 pivotally connected thereto and biasing means for selectively urging the auxiliary implement 4 into ground engagement. Connection means, described below, with the mount member 5 permit the draw tongue 6 and biasing means 7 to be connected thereto to maintain a preselected geometric relationship as the mount member 5 is rotated about the tool bar 2 to multiple mount positions to engage tool bars of different configurations.

In the illustrated example, FIG. 1, a prime mover 10, such as a tractor, is hitched to a first implement 3, such as a tillage implement, which may be of the spring-tooth type, disc harrow type or otherwise. The exemplary first implement 3 has tillage tools 11 which turn over and furrow the earth and leave the earth in such a roughened condition that, in many instances, the field must be finished or smoothed to prepare a seedbed. To accomplish this task with a single pass of the tractor, the exemplary auxiliary implement 4 comprises a finishing attachment having a plurality of teeth 12 thereon, such as of the spring-tooth or tine-tooth variety, and which trails the first implement 3 to smooth the soil, disturb weed root growth, and seal the soil to improve moisture, fertilizer and herbicide retention.

The mount member 5 is substantially universal in its application and may be attached to a variety of first implements 3 which are different in configuration and have variously shaped tool bars 2, such as shown by the tool bars 2 of FIGS. 3 and 4.

Figure 5:
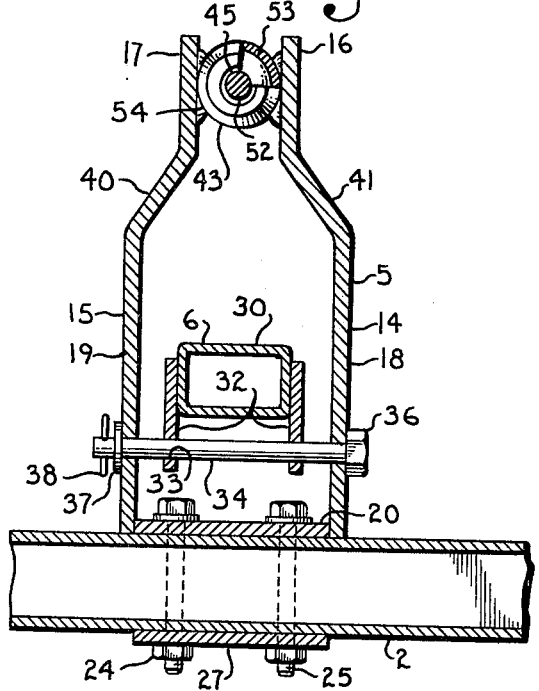
FIG. 5 is a sectional view taken along lines 5—5, FIG. 3.
Figure 6:
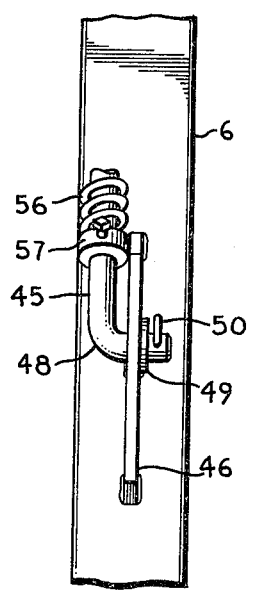
FIG. 6 is a sectional view taken along lines 6—6, FIG. 3.

In the illustrated example, the mount member 5 is of generally planar configuration and includes spaced, parallel triangular plate members 14 and 15 with outward portions such as apex ends 16 and 17, central portions 18 and 19, and a tool bar connection portion such as a flange or web portion 20 generally opposite from the apex ends 16 and 17 and connecting the triangular plate members 14 and 15 together as by welding. A plurality of apertures 21 extend through the web portion 20 and coordinate with fastener means 24 for attaching the mount member 5 to the tool bar 2. The fastener means 24 includes bolts 25 and U-bolts 26 and, with respect to the use of bolts 25, a back plate 27, FIGS. 3 and 5, having a plurality of apertures 28 therethrough is positioned on the opposite side of the tool bar 2 from the mount member 5 and the bolts 25 secure the mount member 5 thereto. When U-bolts 26 are employed, the U-bolts are placed about a portion of the tool bar 2 and the nuts therewith tightened. Use of the U-bolts 26 permits angling the implement mounts 1 with respect to the tool bar 2, as when first implements 3 of swept wing or angled disc gang frame design are employed (not shown).

The mount member 5 is mounted to the tool bar 2 and in a direction generally transverse to the longitudinal axis thereof and so that outward portions such as the apex ends 16 and 17 thereof extend outwardly of the tool bar. The fastener means 24 facilitate selective longitudinal positioning of the mount member 5 on the tool bar 2 as by loosening the bolts 25 or 26 and sliding the mount member 5 on the tool bar 2 in the desired direction to avoid obstructions on the tool bar.

The draw tongue 6 has a mount connection end 30 for attachment to the mount member 5 and a distal end 31 for connection to the auxiliary implement 4. Means pivotally mount the draw tongue 6 to the respective central portions 18 and 19 of the triangular plate members 14 and 15 for up and down swinging movement. In the illustrated example, the mount connection end 30 has spaced ears 32 extended therefrom and having aligned apertures 33 therethrough to receive a pivot pin 34 extending transversely through apertures, described below, in the central portions 18 and 19. A pin head end 36 abuts one of the plate members 14 and 15 and a washer 37 and a spring lock keeper 38 secure the other end of the pivot pin 34.

Adjacent the apex ends 16 and 17, the triangular plate members 14 and 15 have respective neck portions 40 and 41 covergingly angled to suitably mount a bearing member 43, as by welding, between the apex ends 16 and 17 for a purpose described below.

In the illustrated example, the biasing means 7 includes an elongate rod 45 which extends between an outward portion, such as the apex ends 16 and 17 of the triangular plate members 14 and 15 and the draw tongue 6. An upright adjustment flange 46 is positioned along a portion of the draw tongue 6 and between the mount connection end 30 and the distal end thereof and is affixed as by welding. The adjustment flange 46 has a series of apertures 47 extending therethrough. A first end portion 48 of the rod 45 is formed into a right angle for insertion into a selected one aperture 47 and affixed thereto, as by a washer 49 and spring lock keeper 50.

A biasing rod second end portion 52 is slidably mounted to the triangular plate members 14 and 15 by extension through the bearing member 43 affixed to the apex ends 16 and 17. To provide non-binding movement of the rod second end portion 52 as it slides through the bearing member 43 and as the relative angle of the rod 45 changes, the bearing member 43 is of the self aligning type and has an inner bearing member 53 swivably captured within an outer bearing race or housing 54. The outer bearing race or housing 54 is secured to the apex ends 16 and 17 and is affixed in position relative thereto; the inner bearing member 53 moves with the respect to the bearing housing 54 and automatically aligns with the second end portion 52 of the rod 45 extended therethrough.

The biasing means 7 further includes a lower coil spring 56 sleeved about the rod 45 between the bearing member 43 and the rod first end portion 48. The lower spring 46 abuts the bearing member 43 at the upper end thereof and the collar 57 at a lower end thereof and is longitudinally adjustable on the rod 45. The collar 57 is selectively movable on the rod 45 to regulate the amount of downward force applied by the lower coil spring 56 to the draw tongue 6 relative to the mount member 5. An upper coil spring 59 is sleeved over the rod second end portion 52 and abuts an upper side of the bearing member 43. Tension on the upper coil spring 59 is adjusted by means of a washer 60, adjustment nut 61 and jam nut 62.

Depth and pressure adjustment of the auxiliary implement 4 relative to the first implement 3 is accomplished by adjustment of the biasing means 7 wherein the position of the collar 57 on the rod 45 provides major adjustment for the working depth of the auxiliary implement 4. Movement of the upper adjustment nut 61 on the rod second end portion 52 provides relatively fine adjustment for spring tension.

Selective placement of the rod first end portion 48 through one of the apertures 47 also provides a major adjustment of the angle of the draw tongue 6 relative to the mount member 5 and therefore also adjusts the pressure on the auxiliary implement. By positioning the rod first end portion 48 through an aperture close to the mount member 5, FIG. 3, the draw tongue 6 generally extends at a greater angle of inclination than when the rod first end portion 48 extends through an aperture 47 positioned further away from the mount member 5.

By connection to a selected aperture 47, the auxiliary implement 4 can be raised to a non-use position, FIG. 2. The auxiliary implement 4 is lifted manually to swing the draw tongue 6 upwardly and the rod first end portion 48 is positioned within a first aperture 64 furthermost from the mount member 5. Thus, the auxiliary implement 4 is retained in a raised position and disengaged from ground contact for travel over roads, between fields and the like.

To permit shifting or rotation of the mount member 5 to a tool bar top mount position, FIG. 3, or to a tool bar side rear mount position, FIG. 4, the pivot pin 34 for the draw tongue 6 is selectively positioned to extend through either a first pair of aligned apertures 66 or a second pair of aligned apertures 67. The first and second pairs of aligned apertures 66 and 67 are aligned in an arc and spaced equidistantly from the point of attachment of the bearing means 7 to the mount member 5, such as the bearing member 43. Further, the first and second pairs of aligned apertures 66 and 67 are spaced inwardly from the margins of the triangular plate member 14 and 15 and generally located in the central portions 18 and 19.

The positions of the first and second pairs of aligned apertures 66 and 67 permit attaching the mount member 5 to the top or rear side of the first implement tool bar 2 while maintaining an equal geometrical relationship to the bearing member 43 for equal downward pressure on the auxiliary implement 4, regardless of the mount position. Further, the first and second pairs of aligned apertures 66 and 67 in the respective top and rear side mount positions are preferably located a substantially equal vertical distance from the tool bar top wall so that the relative distance of the first pair of aligned apertures 66 and the second pair of aligned apertures 67 from the ground surface are substantially the same regardless of whether the mount member 5 is affixed in a top mount position, FIG. 3 or a rear side mount position, FIG. 4. This maintains the same or substantially the same geometric relationship for equal amounts of down pressure on various sections of auxiliary implements 4 which may be connected in a line to a first implement 3.

A geometric relationship taking the shape of a triangle is formed by the location of pivot means comprising the pivot pin 34, the bearing member 43 and the pivot connection of the rod first end portion 48. One leg of the triangle, extending between the bearing member 43 and the draw tongue pivot pin 34, remains the same length regardless of whether the draw tongue is connected to the first or second pair of aligned apertures 66 and 67. A second leg of the triangle, extending between the pivot pin 34 and the aperture 47 selected for engagement with the rod first end portion 48, is variable in length to provide adjustment of the working depth and pressure on the auxiliary implement 4. A third leg of the triangle, extending between the bearing member 43 and the aperture 47 selected for engagement with the rod first end portion 48 is also variable in length for adjustment of working depth and pressure.

In the use of the universal auxiliary implement mount, the mount member 5 is positioned either in a top mount position, FIG. 3, with the web portion 20 thereof against the top wall of the tool bar 2 or in a rear side mount position, FIG. 4, with the web portion 20 against the rear side wall of the tool bar 2, FIG. 4. If the auxiliary implement mount 1 is used in a top mount position, the draw tongue pivot pin 34 is extended through the first pair of aligned apertures 66 so that the draw tongue 6 extends rearwardly of the first implement 3.

To move the mount member 5 to a rear side mount position, FIG. 4, the spring lock keepers 38 and 50 of the respective draw tongue 6 and biasing rod 45 are disengaged and the rod first end portion 48 is pulled from the adjustment flange 46. The mount connection end 30 of the draw tongue is withdrawn from the mount member 5 and the adjustment and jam nuts 61 and 62 disengaged from the second end portion 52 of the rod 45 so that the rod can be pulled from the bearing member 43.

The mount member 5 is then affixed to the tool bar 2 at a selected longitudinal location thereon and so that the apex ends 16 and 17 extend upwardly and rearwardly from the tool bar 2. The mount connection end 30 of the tongue 6 is inserted into the mount member 5 between the triangular plate members 14 and 15 with the spaced ears 32 extending downwardly and the pivot pin 34 extended through the second pair of aligned apertures 67 with the ear apertures 33 therebetween. The second end portion 52 of the biasing rod 45 is urged through the bearing member 43 and the upper coil spring 59, washer 60, adjustment nut 61 and jam nut 62 suitably connected thereto. The first end portion 48 of the rod 45 is positioned in a selected aperture 47 in the adjustment flange 46. For ease of adjustment, a row of auxiliary implements 4 attached by the universal auxiliary implement mounts 1 can be mounted along the length of the tool bar 2 with the mount members 5 in various top and rear side mount positions and with the respective rod first end portions 48 extended through the same positioned aperture 47 in the respective adjustment flanges 46, thereby permitting ease of adjustment for even pressure of ground engagement between respective auxiliary implement mounts 1 and auxiliary implements 4.

It is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. An auxiliary implement mount adapted for selective positioning on an implement tool bar; said mount comprising:

(a) a plate member having spaced first and second portions; a connecting means for mounting said plate member generally transversely to the longitudinal axis of said tool bar;

(b) a longitudinal draw tongue having first and second ends; said draw tongue for connecting an auxiliary tool to said tool bar; said draw tongue including a plurality of longitudinal spaced receiving apertures generally transversely positioned relative to the longitudinal axis of said draw tongue between said first and second ends;

(c) pivot means for mounting said draw tongue near said first end thereof to said plate member first portion;

(d) a bearing member pivotally mounted on said plate member second portion; and (e) a biasing rod having a first end reciprocally mounted in said bearing member and a second end; said second end including a generally right angle portion for selectively and detachably inserting into one of said receiving apertures and for pivotally connecting to said draw tongue;

(f) said bearing member being self aligning and having an inner bearing portion swivelably captured within an outer bearing race and permitting reciprocation of said biasing rod through said inner bearing portion and pivoting of said inner bearing member relative to said outer bearing race such that detachment and reattachment of said biasing rod relative to said draw tongue is facilitated.

2. An auxiliary implement mount adapted for selective positioning on a respective tool bar having top and side surfaces and of different first implements and comprising:

(a) spaced, parallel, triangular plate members respectively having apex ends, central portions spaced from said apex ends and a web portion opposite from said apex ends and connecting said triangular plate members;

(b) a plurality of apertures extended through said web portion;

(c) fastener means for extension through said apertures and selective mounting of said triangular plate members to said tool bar generally transversely to the longitudinal axis thereof;

(d) a draw tongue for connection to an auxiliary implement and having an opening through an end thereof;

(e) means pivotally mounting said draw tongue to the central portions of said triangular plate members for up and down swinging movement and including a pivot pin extending through said draw tongue opening and through said triangular plate members;

(f) a biasing rod having one end pivotally mounted to said draw tongue intermediately of the ends thereof and a second end slidably mounted to said triangular plate members at said apex ends; said biasing rod having a coil spring sleeved thereon for urging said draw tongue downwardly; and (g) a bearing member pivotally mounted between said apex ends with said biasing rod second end reciprocable therethrough;

(h) said means pivotally mounting said draw tongue to said triangular plate members include first and second pairs of aligned apertures through said central portions and spaced equidistantly from said bearing member whereby said triangular plate members are selectively attachable to said tool bar in a top mount position and a rear side mount position with said apex ends disposed upwardly and rearwardly of said tool bar; said pivot pin mounting said draw tongue to said triangular plate members extending through said first pair of apertures when said triangular plate members are in a top mount position and through said second pair of apertures when said triangular plate members are in a rear side mount position with said draw tongue extending downwardly and rearwardly from said triangular plate members in both of said mount positions.

3. The auxiliary implement mount set forth in claim 2 wherein:
 (a) said bearing member is a self aligning bearing having an inner bearing member swivellably captured within an outer bearing race and permitting reciprocation of said biasing rod through said inner bearing member and pivoting of said inner bearing member relative to said outer bearing race.

4. The auxiliary implement set forth in claim 2 wherein:
 (a) a triangular arrangement is formed having points at said draw tongue pivot pin, said bearing member and the pivotal mounting of said biasing rod one end to said draw tongue; and
 (b) said triangular arrangement forms legs extending between said points with one of said legs being set in length and the other two of said legs being selectively adjustable in length for adjusting the angle of extension of said draw tongue relative to said triangular plate members.

5. An auxiliary implement mount adapted for selective positioning on an implement tool bar; said mount comprising:
 (a) a plate member having a first portion and a second portion spaced from said first portion; said plate member including connecting means for mounting said plate member generally transversely to the longitudinal axis of said tool bar;
 (b) a draw tongue having first and second ends; said draw tongue for connecting an auxiliary tool to said tool bar;
 (c) first and second spaced pivot means for alternatively and pivotally connecting said draw tongue near said first end thereof to said plate member first portion;
 (d) biasing means comprising an elongate rod having a first and a second end; said rod being pivotally mounted near said first end thereof to said draw tongue; said rod second end being spaced from said first end thereof and slidably mounted on said plate member second portion; said biasing means further including a mechanism for urging said draw tongue downwardly; and
 (e) said first and second pivot means being generally spaced equidistantly from the location of mounting of the biasing means second end on said plate member first portion whereby said plate member is selectively attachable to said tool bar in a top mount position utilizing said first pivot means to connect said draw tongue to said plate member and a rear side mount position utilizing said second pivot means to connect said fraw tongue to said plate member such that the geometric relationship between said biasing means and said draw tongue is substantially the same when in said top mount position and when in said rear side mount position.

6. The mount set forth in claim 5 wherein:
 (a) said biasing means includes a rod having one end pivotally connected to said draw tongue and a second end reciprocally and pivotally connected to said plate member second portion;
 (b) said plate member second portion having a bearing affixed thereto with said rod second end extending therethrough; and
 (c) a coil spring sleeved on said rod and extending between said bearing and said draw tongue for biasing said draw tongue downwardly relative to said plate member.

7. The auxiliary implement mount set forth in claim 5 wherein:
 (a) said first and second pivot means each respectively having an aperture sized to receive a pin perpendicular to said plate member; said pin being a common pin located on said draw tongue.

8. The mount set forth in claim 5 wherein:
 (a) said plate member is generally triangular in shape and said plate member second portion is an apex end, said apex end being disposed laterally from said draw tongue; and
 (b) said plate member includes a flange projecting from said triangular plate member for connecting said mount to said tool bar.

9. The auxiliary implement mount set forth in claim 8 wherein said plate member comprises:
 (a) a pair of spaced, parallel triangular plates respectively having apex ends and said flange forms a web portion opposite each of said plate apex ends connecting said triangular plates; and
 (b) a bearing member pivotally mounted between said plates apex ends with said biasing means second end connected thereto.

* * * * *